Dec. 6, 1955 J. D. TURLAY 2,725,859
INTAKE MANIFOLD
Filed Jan. 7, 1954 4 Sheets-Sheet 1

INVENTOR
Joseph D. Turlay
BY
L. D. Burch
ATTORNEY

Dec. 6, 1955  J. D. TURLAY  2,725,859
INTAKE MANIFOLD
Filed Jan. 7, 1954  4 Sheets-Sheet 2
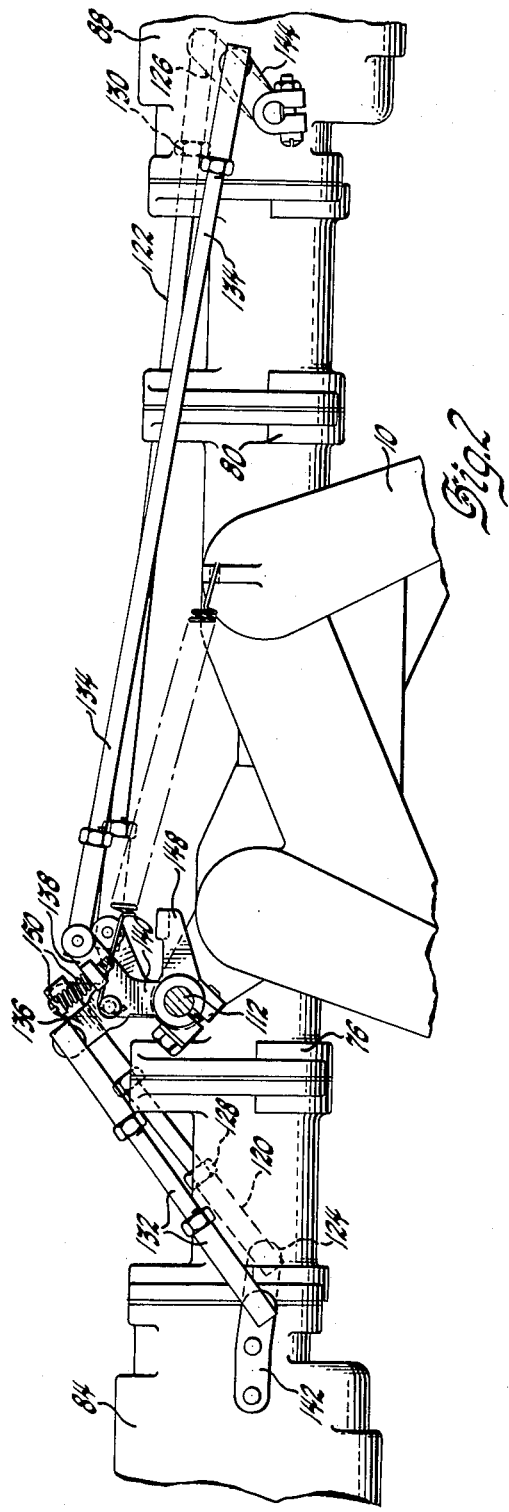
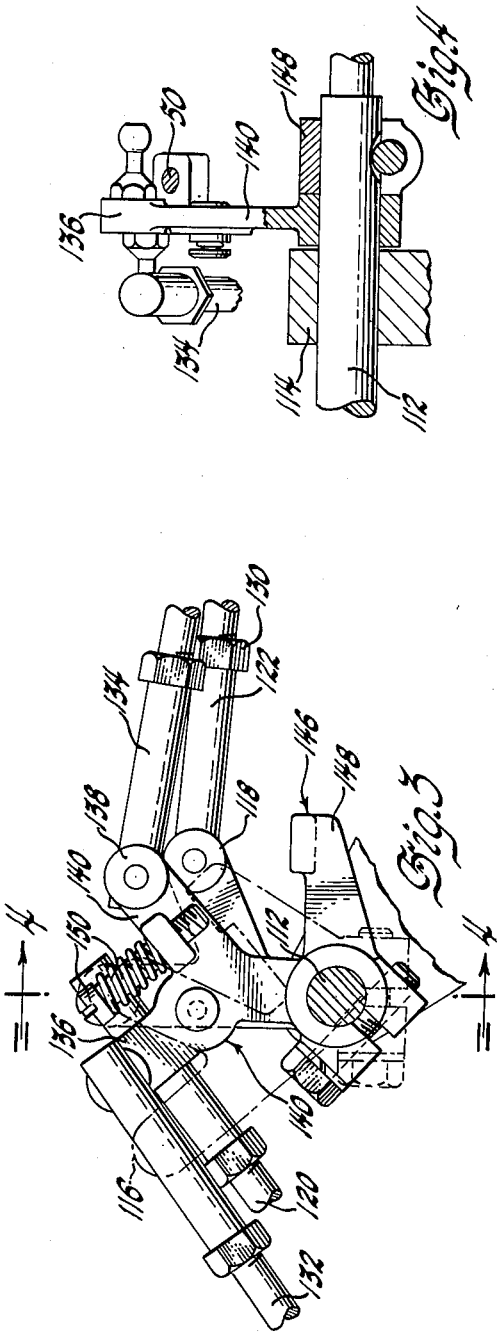
INVENTOR
Joseph D. Turlay
BY
L. D. Buch
ATTORNEY

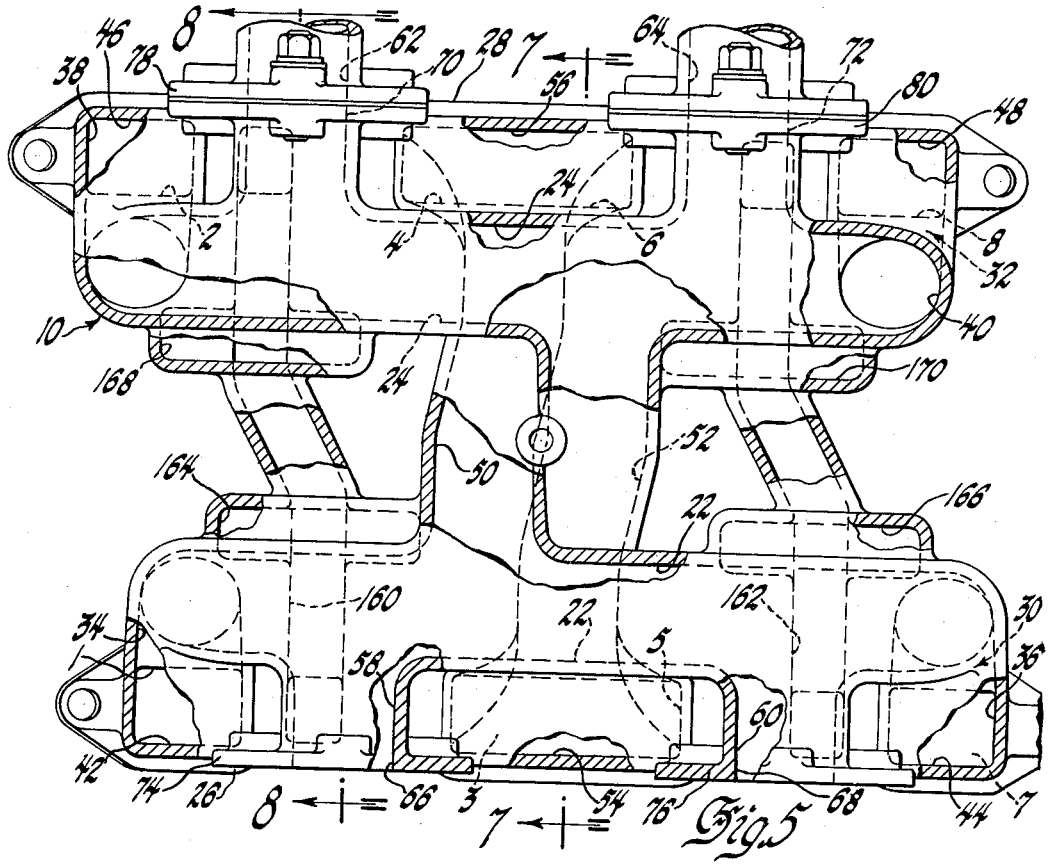

Dec. 6, 1955   J. D. TURLAY   2,725,859
INTAKE MANIFOLD

Filed Jan. 7, 1954   4 Sheets-Sheet 4

INVENTOR
Joseph D. Turlay
BY
L. D. Cush
ATTORNEY

United States Patent Office 2,725,859
Patented Dec. 6, 1955

2,725,859

INTAKE MANIFOLD

Joseph D. Turlay, Flint, Mich., assignor to General Motors Corporation, Detroit, Mich., a corporation of Delaware Application January 7, 1954, Serial No. 402,758

21 Claims. (Cl. 123—52)

The present invention relates to charge forming devices for engines and has particular relation to an intake manifold for use with a multiplicity of carburetors.

In the past numerous attempts have been made to improve the volumetric efficiency of internal combustion engines by the use of multiple carburetion. In order to obtain the optimum engine output, it is desirable to group the engine cylinders so that they will be supplied a combustible charge by means of separate or independent distribution passages. Although there are intake manifolds for V-type engines which permit the desired groupings of cylinders, due to the angular disposition of the cylinders and space limitations, it is difficult to shape the passages to give the desired engine characteristics when a multiplicity of carburetors are employed. Moreover since it is necessary to have some of the passages cross each other, there may be resultant restrictions which materially impede the flow of the charge therethrough.

It is now proposed to provide an intake manifold which is adapted to employ a multiplicity of carburetors and will deliver a substantially uniform charge to every cylinder with a minimum amount of flow resistance. The manifold may be provided with a pair of horizontal runner passages that communicate with a plurality of carburetors. Each of the runner passages may extend the length of the manifold adjacent to and parallel with a bank of cylinders so that a plurality of passages may interconnect one group of cylinders with one runner passage and another group of cylinders with the other runner passage.

In order to provide a smooth and efficient engine operation at all times, it is desirable to synchronize the carburetor throttle valves so that each group of cylinders will receive identical charges. In addition where a plurality of carburetors are employed, it is desirable that as few carburetors as possible be in operation during idle conditions and as many as possible be in operation during full load conditions.

It is now proposed to provide a throttle control linkage which will permit all of the carburetor throttle valves to be easily synchronized. In addition to permitting the position of each individual throttle valve to be independently adjusted, the linkage will cause the throttle valves of a group of primary carburetors to partially open before the throttle valves of a group of secondary carburetors open.

In order to improve the roadability of an automotive vehicle, it is desirable to have the center of gravity of the vehicle as low as possible. One way of lowering the center of gravity is to decrease the height of the vehicle. One of the limiting factors in lowering the vehicle body is the height of the engine. This problem is particularly acute in the so-called V-type engine where the intake manifold is mounted between the banks of cylinders as this construction normally requires the use of a downdraft carburetor with the air cleaner assembly mounted on the top thereof. This frequently causes the top of the engine to be too high to permit the engine hood to be lowered the same amount as the remainder of the body.

It is proposed to employ an intake manifold for V-type engines which will materially reduce the overall height of the engine. The manifold is adapted to be disposed between the banks of cylinders and employ a multiplicity or sidedraft carburetors that project laterally from the sides of the manifold. This will permit the air cleaner assemblies to be mounted along the sides of the engine rather than projecting upwardly therefrom and thereby materially reducing the overall height of the engine.

In the four sheets of drawings:

Fig. 2 is an end view of a portion of the manifold of Fig. 1.

Fig. 3 is an enlarged view similar to Fig. 2 and showing a portion of the throttle control linkage.

Fig. 4 is a cross sectional view taken substantially along the plane of line 4—4 in Fig. 3.

Fig. 5 is a plan view of the intake manifold, portions thereof being broken away to more clearly show the details of the passages therein.

Fig. 6 is an end view of an engine employing the present manifold.

Figure 1:
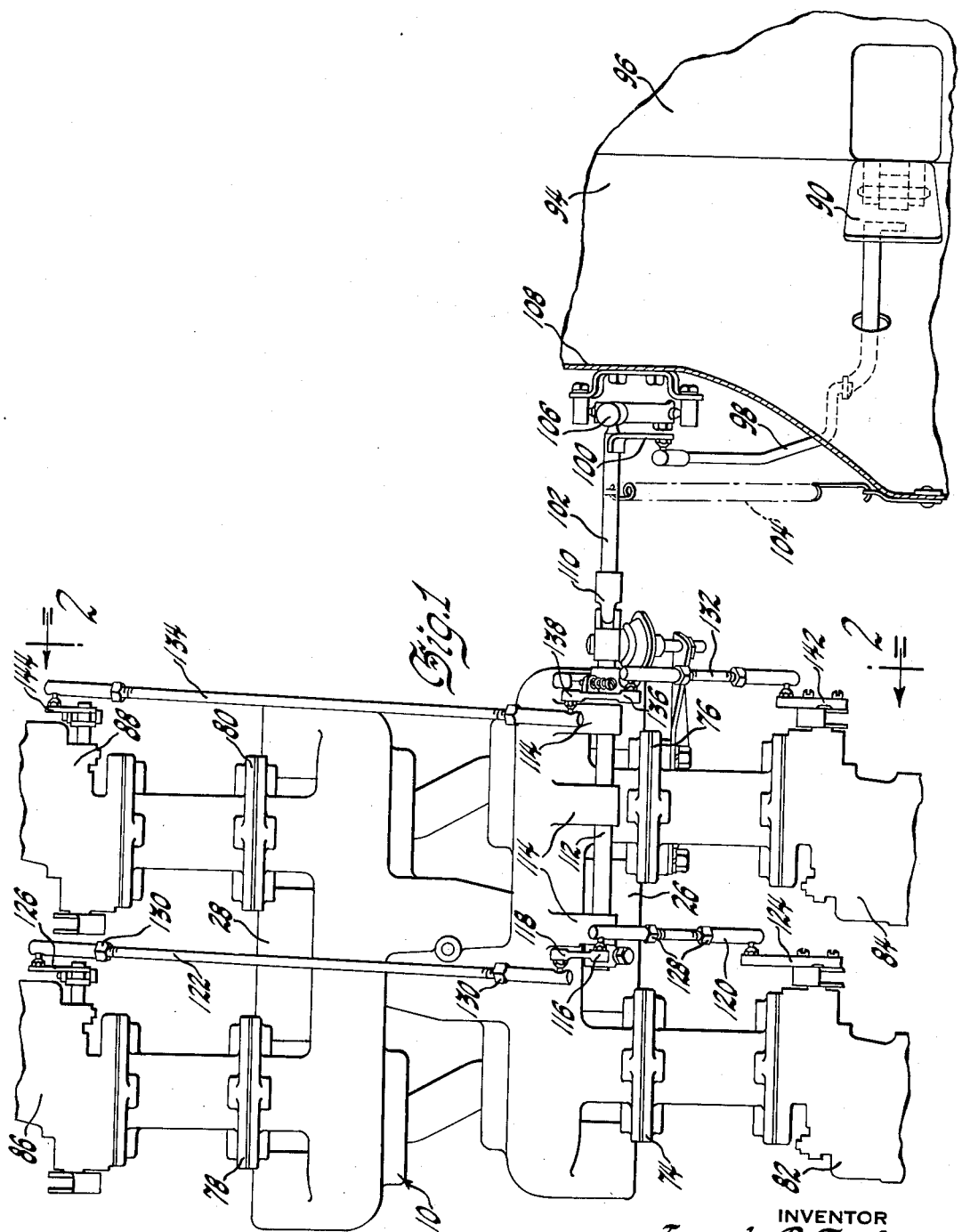
Fig. 1 is a plan view of a manifold embodying the present invention.
Figure 7:
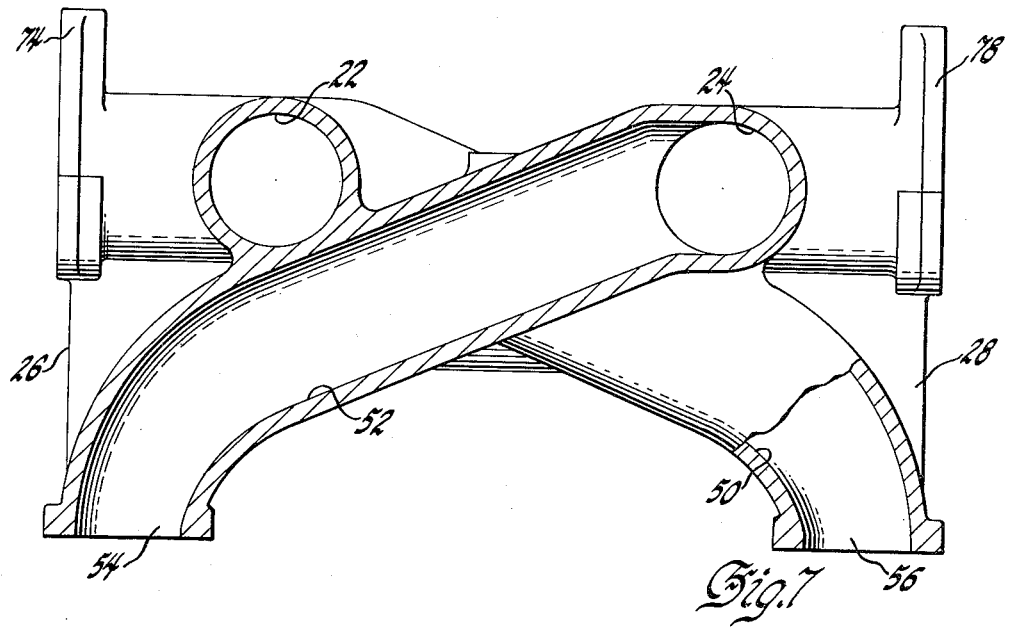
Fig. 7 is a cross sectional view taken substantially along the plane of line 7—7 in Fig. 5.
Figure 8:
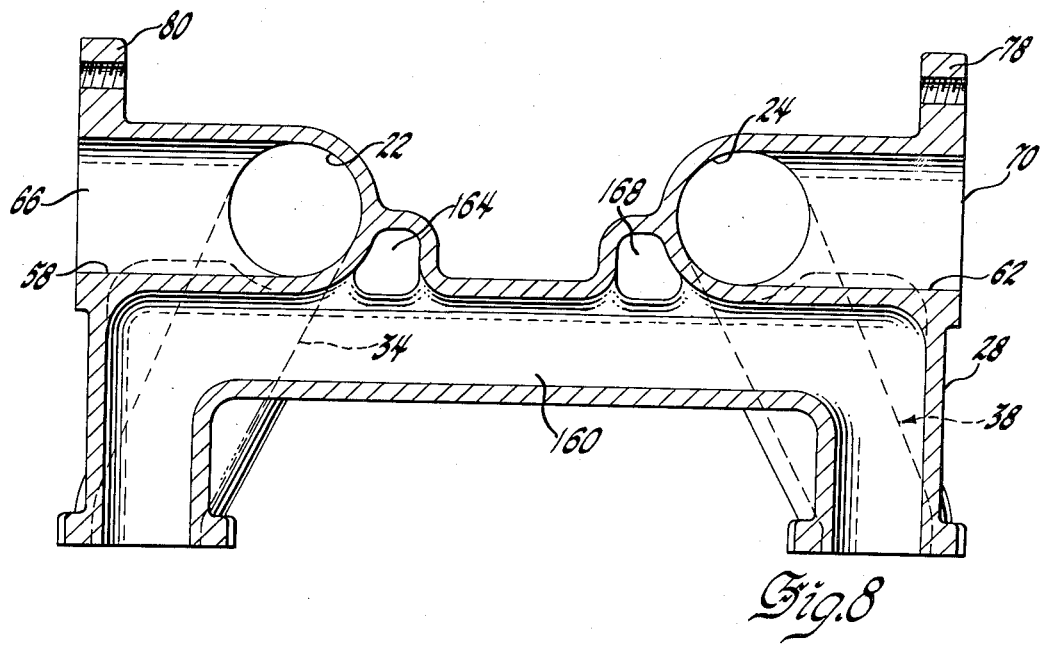
Fig. 8 is a cross sectional view taken substantially along the plane of line 8—8 in Fig. 5.

Referring to the drawings in more detail, the present invention may be embodied in any suitable intake manifold 10. In the present instance the manifold 10 is adapted to be employed on a V-type engine 12 having two banks 14 and 16 of angularly disposed cylinders, each bank of which contains four aligned cylinders. The cylinders in bank 14 are numbered 1, 3, 5 and 7 while the cylinders in bank 16 are numbered 2, 4, 6 and 8. The manifold 10 is adapted to be disposed between and above the two banks 14 and 16 so as to communicate with the intake ports in each of the cylinder heads 18 and 20.

The manifold 10 may contain two runner passages 22 and 24 that extend horizontally the length thereof. Each of the runner passages 22 or 24 is preferably disposed along a side 26 or 28 of the manifold 10 so as to be substantially parallel with and adjacent to a bank 14 or 16 of cylinders. Although the passages 22 and 24 may have any desired cross section, they are preferably straight and possess a cylindrical surface.

Two sets 30 and 32 of distribution passages 34, 36, 38 and 40 may be provided in the manifold 10 with one set on each side 26 or 28 thereof. Each set 30 or 32 includes a pair of distribution passages 34 and 36 or 38 and 40 that are disposed substantially normal to the runner passages 22 or 24 on that side. The distribution passages 34 and 36 are preferably inclined so as to extend straight from the opposite ends of runner passage 22 to form a pair of aligned apertures 42 and 44 on side 26 that are positioned to register with the inlet ports in the head 18. The distribution passages 38 and 40 are normal to runner passage 24 and form outlets 46 and 48 in side 28. These inlet ports in turn preferably communicate with the cylinders at the end of the bank adjacent thereto.

A pair of independent branch passages 50 and 52 may be disposed transversely of the manifold 10. Each branch passage may be inclined so that the upper end thereof communicates with the center of one of the runner passages 22 or 24. Each branch passage 50 or 52 extends downwardly and transversely from the runner passage 22 or 24 so as to form apertures 54 and 56 in the sides of the manifold 10 opposite their respective runner passages 22 or 24. These apertures 54 and 56 are preferably in alignment with the apertures 42 and 44 and 46 and 48, respectively, in the ends of the sides 26 and 28 and are positioned to communicate with the center inlet ports. Since these inlet ports communicate with the two cylinders in the center of the banks 14 or 16, a combustible fuel charge may flow from the runner passage 22 or 24 on one side of the manifold to the two cylinders forming the center of the bank 16 or 14, respectively, on the opposite side. It can thus be seen that the cylinders are divided into two groups 1, 4, 6, 7 and 2, 3, 5, 8 in which the two end cylinders in one bank and the two center cylinders in the opposite bank communicate with a common runner passage disposed on the side of the manifold closest to said end cylinders. This produces the desired grouping for a firing order such as 1, 8, 7, 3, 6, 5, 4, 2. It should be understood that each of the branch passages 50 and 52 may be in the form of two passages that interconnect the runner passage on one side of the manifold with two ports in the center of the opposite side of the manifold. Thus there would be four branch passages instead of the two 50 and 52.

Inlet passages may be disposed in the manifold so as to communicate with a runner passage for directing the flow of a combustible fuel charge from a carburetor into a runner passage. In the present instance a pair of inlet ducts 58 and 60 and 62 and 64 are provided for each runner passage 22 and 24, respectively. The inlet ducts 58, 60, 62 and 64 are positioned substantially horizontal so as to extend at right angles from the runner passages 22 and 24 to form four inlet openings 66 and 68 and 70 and 72 in the sides 26 and 28, respectively, of the manifold 10. The outer end of each inlet duct may be provided with a flange 74, 76, 78, 80 that extends around the opening 66, 68, 70 or 72 therein to permit a suitable sidedraft carburetor 82, 84, 86 or 88 to be mounted thereon. The inner end of each of the inlet ducts may intersect runner passage 22 or 24 along a portion thereof which is disposed between the points of intersection of the runner passage 22 or 24 with its branch passage 50 or 52 and a distribution passage 34, 36, 38 or 40. Thus during engine operation as the air passes through the carburetors 82, 84, 86 and 88, it will be mixed with the fuel to form a combustible charge of air and fuel that flow into the runner passages 22 and 24. This mixture then passes into a distribution passage 34, 36, 38 or 40 or a branch passage 50 or 52 which will then conduct the charge into the desired cylinder.

In order to provide a smoothly operating and efficient engine at all load conditions, the air flowing through the carburetor venturis must flow fast enough at low speeds to produce proper atomization of the fuel and yet the flow resistance must remain low enough so as not to materially reduce the volumetric efficiency at high speeds. Accordingly when a multiplicity of carburetors are employed, it is desirable to have as few carburetors as possible in operation at low speeds and as many as possible in operation at high speeds. Thus it has been found advantageous to employ one primary carburetor 82 and 86 and one secondary carburetor 84 and 88 for each group of cylinders 1, 4, 6, 7 and 2, 3, 5, 8, respectively. Therefore if desired, the inlet ducts 58 and 62 may communicate with a primary carburetor 82 and 86, respectively, and inlet ducts 60 and 64 may communicate with a secondary carburetor 84 and 88, respectively. This will provide a primary carburetor and a secondary carburetor for each runner passage. The throttle valves in the primary carburetors 82 and 86 are adapted to open as soon as the accelerator pedal 90 is depressed. The throttle valves in the secondary carburetors 84 and 88 are adapted to remain closed until the primary throttle valves are partially open and the engine is drawing sufficient air to insure proper operation of both the primary and the secondary carburetors. If the primary throttle valves are opened further after this condition is reached, the secondary throttle valves may be opened. As the primary throttle valves continue to open, the secondary throttle valves preferably open at such a rate that both the primary and secondary valves will simultaneously reach the fully opened position so that at full load each carburetor will produce the minimum flow resistance and all of the passages will be carrying its full share of the charge.

In order to provide a unitary control for simultaneously actuating the throttle valves of both the primary and secondary carburetors 82 and 86 and 84 and 88, a suitable linkage system 92 may be provided for actuation by a suitable foot operated accelerator pedal. The foot pedal 90 may be hinged on the floor 94 for swinging toward and away from the toe board 96. The present accelerator pedal 90 has a push rod 98 that is connected to an arm 100 that projects from a shaft so that movement of the pedal will rotate the shaft 102. A spring 104 may be connected to the shaft 102 so as to resiliently oppose the movement of the accelerator pedal 90. One end of the shaft 102 may be journaled in a gimbal member 106 so that relative movement of the engine and dashboard 108 will not effect the angular position of the shaft 102. The opposite end of the shaft 102 may be provided with a universal joint 110 for connection to an equalizer shaft 112 that is journaled in one or more suitable bearings 114 on the top of the manifold 10. One end of this shaft 102 may be provided with a pair of arms 116 and 118 that project from the shaft so as to rotate therewith. A pair of links 120 and 122 may have the upper ends thereof connected to these arms 116 and 118, respectively, with the outer ends thereof connected to the levers 124 and 126 on the throttle valve shafts of the primary carburetors. In order to insure that the movement of the throttle valves in each primary carburetor are identical, each of the links may have threaded means 128 and 130 for adjusting their length. This will allow the lengths of the links 120 and 122 to be adjusted to synchronize the primary throttle valves so that they will always be open identical amounts. Thus depressing the accelerator pedal 90 will open the primary throttle valves and the spring 104 will close them when the pedal 90 is released.

In order to properly actuate the secondary throttle valves, a second pair of links 132 and 134 may be provided. The inner ends of these links 132 and 134 are secured to the arms 136 and 138 of a Y member 140 and the outer ends are secured to the levers 142 and 144 on the throttle shafts. The Y member 140 is journaled for rotation about the axis of the equalizer shaft 112. Suitable lost motion means 146 may be provided for causing the Y member 140 to rotate with the equalizer shaft 112 after the primary throttle valves are partially open but permitting the equalizer shaft 112 to rotate without effecting the position of the Y member 140 during the initial movement of the primary throttle valves. In the present instance this includes an arm 148 on the equalizer shaft 112 and a screw 150 on the Y member 140 which are positioned to engage each other during rotation of the equalizer shaft 112. Thus after the shaft 112 has rotated counterclockwise to partially open the primary throttle, the arm 148 will strike the screw 150 and cause the Y member 140 to rotate with equalizer shaft 112. It has been found advantageous to have this engagement occur when the primary throttle valves are approximately half open. If counterclockwise rotation continues after this engagement, the arm 148 will move the screw 150 and rotate the Y member 140 which in turn will cause all of the throttle valves to open simultaneously. To allow the engine 12 to develop its peak output it is very desirable that all of the throttle valves reach the fully open position at the same time. Accordingly, the screw 150 and the links 120, 122, 132 and 134 may all be adjusted until both the primary and secondary throttle valves reach the fully open position at the same time. It should be noted that the length of the levers are preferably proportioned so that the secondary valves will move from the fully closed position to the fully open position while the primary valves move from only the half open position to the fully open position.

At times it may be desirable to reduce the effects of liquid fuel particles precipitating from the fuel charge by heating the surface of the inlet ducts 58, 60, 62 and 64 and runner passages 22 and 24 by suitable means such as the engine exhaust or hot water from the cooling jacket. Thus when the liquid fuel particles settle on any of these surfaces they will immediately be evaporated back into the charge. In the present instance this has been accomplished by providing a pair of exhaust cross over conduits 160 and 162 that extend transversely of the manifold in heat exchanging relation with the surface of the inlet ducts 58, 60, 62 and 64. When the engine is cold the engine exhaust gases may be diverted through these conduits 160 and 162 and heat these surfaces. In addition, the conduits 160 and 162 may be enlarged to provide chambers 164, 166, 168 and 170 around portions of the runner passages 22 and 24 so as to form hot spots in substantial alignment with the ends of the inlet ducts 58, 60, 62 and 64. Thus when the inertia of the larger fuel particles in the inlet passage cause them to strike this surface while the air turns to flow the length of the runner passages 22 and 24, they will be evaporated into a plurality of smaller particles.

It is to be understood that, although the invention has been described with specific reference to a particular embodiment thereof, it is not to be so limited since changes and alterations therein may be made which are within the full intended scope of this invention as defined by the appended claims.

What is claimed is:

1. An intake manifold comprising a pair of parallel runner passages extending longitudinally thereof, two sets of distribution passages, each of said distribution passages having one end thereof communicating with an end of one of said runner passages and the other end thereof forming an outlet at the ends of the opposite sides of said manifold, branch passages, each of which have one end thereof communicating with the center portion of one of said runner passages and the other end thereof forming outlets from said manifold, and inlet duct means communicating with each of said runner passages.

2. An intake manifold comprising a pair of parallel runner passages extending longitudinally thereof, two pairs of distribution passages, the distribution passages in each of said pairs communicating with the opposite ends of one of said runner passages so as to form two pairs of aligned outlets adjacent the sides of said manifold, branch passages extending transversely of said manifold, one end of each of said branch passages communicating with one of said runner passages and the other end thereof forming an outlet in substantial alignment with the outlets formed by the pair of distribution passages communicating with the other of said runner passages, and inlet duct means communicating with each of said runner passages.

3. An intake manifold comprising a pair of parallel runner passages, each of said runner passages extending longitudinally of said manifold adjacent one side thereof, two sets of distribution passages, the distribution passages in each set communicating with the opposite ends of one of said runner passages and forming aligned outlets in the side of said manifold adjacent said runner passage, branch passages extending transversely of said manifold, each of said branch passages having one end thereof communicating with a runner passage on one side of said manifold and the other end thereof forming an outlet in the opposite side of said manifold in substantial alignment with the outlets formed by the distribution passages communicating with the runner passage on said opposite side, and at least one inlet duct communicating directly with each of said runner passages.

4. An intake manifold for an engine having two angularly disposed banks of cylinders with four aligned cylinders in each bank, said manifold comprising a pair of substantially parallel longitudinal runner passages, each of said runner passages being disposed substantially parallel to a side of said manifold which is adjacent one of said banks of cylinders, two sets of distribution passages, the distribution passages in each of said sets communicating with the opposite ends of one of said runner passages and forming outlets in the ends of one of said sides of the manifold for communication with the end cylinders in the adjacent bank of cylinders, separate branch passages, each of said branch passages communicating with the center portion of one of said runner passages and forming an outlet in the other of said sides of said manifold for communicating with the cylinders in the center of the bank adjacent said last mentioned side, and an inlet duct for fuel mixing means communicating directly with said runner passages.

5. An intake manifold for an engine having two angularly disposed banks of cylinders with four aligned cylinders in each bank, said manifold comprising a pair of substantially parallel longitudinal runner passages, each of said runner passages being disposed substantially parallel to a side of said manifold which is adjacent one of said banks of cylinders, two sets of distribution passages, the distribution passages in each of said sets communicating with the opposite ends of one of said runner passages and forming outlets in the ends of one of said sides of the manifold for communication with the end cylinders in the bank adjacent said side, separate branch passages, each of said branch passages communicating with the center portion of one of said runner passages and forming an outlet in the other of said sides of said manifold for communicating with the cylinders in the center of the bank adjacent said last mentioned side, and two sets of independent inlet ducts for fuel mixing means, each of said sets including inlet ducts communicating with one of said runner passages between a branch passage and a distribution passage.

6. An intake manifold for an engine having two angularly disposed banks of cylinders with four aligned cylinders in each bank, said manifold comprising a pair of substantially parallel longitudinal runner passages, each of said runner passages being disposed substantially parallel to and adjacent a side of said manifold which is adjacent one of said banks of cylinders, two sets of distribution passages, the distribution passages in each of said sets communicating with the opposite ends of one of said runner passages and forming outlets in the ends of the side of the manifold closest to said runner passage for communication with the end cylinders in the bank adjacent said side, separate branch passages, each of said branch passages communicating with the center portion of one of said runner passages and forming an outlet in the side of said manifold farthest from said last mentioned runner passage for communicating with the cylinders in the center of the bank adjacent said last mentioned side, a pair of independent inlet ducts for two separate primary carburetors, and a pair of independent inlet ducts for two separate secondary carburetors, one duct from each pair communicating with one of said runner passages.

7. An intake manifold for an engine having two angularly disposed banks of cylinders with four aligned cylinders in each bank, said manifold comprising a pair of substantially parallel longitudinal runner passages, each of said runner passages being disposed substantially parallel to and adjacent a side of said manifold which is adjacent one of said banks of cylinders, two sets of distribution passages, the distribution passages in each of said sets communicating with the opposite ends of one of said runner passages and forming outlets in the ends of the side of the manifold closest to said runner passage for communication with the end cylinders in the bank adjacent said side, separate branch passages, each of said branch passages communicating with the center portion of one of said runner passages and forming an outlet in the side of said manifold farthest from said last mentioned runner passage for communicating with the cylinders in the center of the bank adjacent said last mentioned side, a pair of independent inlet ducts for two separate primary carburetors, a pair of independent inlet ducts for two separate secondary carburetors, one duct from each pair communicating with one of said runner passages, and a throttle linkage for actuating the throttle valves in said carburetors, said linkage including lost motion means for permitting the throttle valves in said primary carburetor to open partially before the throttle valves in said secondary carburetor open.

8. An intake manifold for an engine having two angularly disposed banks of cylinders with four aligned cylinders in each bank, said manifold comprising a pair of substantially parallel longitudinal runner passages, each of said runner passages being disposed substantially parallel to a side of said manifold which is adjacent one of said banks of cylinders, two sets of distribution passages, the distribution passages in each of said sets communicating with the opposite ends of one of said runner passages and forming outlets in the ends of one of said sides of the manifold for communication with the end cylinders in the adjacent bank of cylinders, separate branch passages, each of said branch passages communicating with the center portion of one of said runner passages and forming an outlet in the other of said sides of said manifold for communicating with the cylinders in the center of the bank adjacent said last mentioned side, an inlet duct for fuel mixing means for each of said runner passages, and conduit means for carrying a heated medium through said manifold in heat exchanging relation with the interior surface of said inlet ducts.

9. An intake manifold for an engine having two angularly disposed banks of cylinders with four aligned cylinders in each of said banks, said manifold comprising a pair of substantially parallel runner passages, each of said runner passages extending longitudinally of said manifold substantially parallel to a side thereof which is adjacent to and parallel with one of said banks of cylinders, two pairs of distribution passages, the distribution passages in each of said pairs being disposed substantially normal to one of said runner passages so as to communicate with the opposite ends of said last mentioned runner passage and also being positioned to form outlets in the ends of the side of the manifold closest to said runner passage for communication with the end cylinder in the bank adjacent said last mentioned side, two branch passages disposed normal to said runner passages and extending transversely of said manifold, each of said branch passages communicating with the center of one of said runner passages and forming an outlet in the side of said manifold farthest from said last mentioned runner passage for communicating with the cylinders in the center of the bank adjacent said last mentioned side, and a pair of inlet ducts for fuel mixing means communicating with each of said runner passages, each of said ducts being disposed normal to a runner passage and communicating with said runner passage between a distribution passage and a branch passage.

10. An intake manifold for an engine having two angularly disposed banks of cylinders with four aligned cylinders in each of said banks, said manifold comprising a pair of substantially parallel runner passages, each of said runner passages extending longitudinally of said manifold substantially parallel to a side thereof which is adjacent to and parallel with one of said banks of cylinders, two pairs of distribution passages, the distribution passages in each of said pairs being disposed substantially normal to one of said runner passages so as to communicate with the opposite ends of said last mentioned runner passage and also being positioned to form outlets in the ends of the side of the manifold closest to said last mentioned runner passage for communication with the end cylinder in the bank adjacent said last mentioned side, two branch passages disposed normal to said runner passages to extend transversely of said manifold, each of said branch passages communicating with the center of one of said runner passages and forming an outlet in the side of said manifold farthest from said last mentioned runner passage for communicating with the cylinders in the center of the bank adjacent said last mentioned side, and two pairs of inlet ducts, the ducts in each of said pair being disposed normal to a runner passage and communicating with said last mentioned runner passage between a distribution passage and a branch passage, two primary carburetors, each of which communicate with one of the inlet ducts in each of said pair, two secondary carburetors, each of which communicates with the other inlet duct in each of said pair, and a throttle control linkage for actuating the throttle valves in said carburetors, said linkage having lost motion means for permitting the throttle valves in said primary carburetors to partially open before the throttles in said secondary carburetors open.

11. An intake manifold for an engine having two angularly disposed banks of cylinders with four aligned cylinders in each of said banks, said manifold comprising a pair of substantially parallel runner passages, each of said runner passages extending longitudinally of said manifold substantially parallel to a side thereof which is adjacent to and parallel with one of said banks of cylinders, two pairs of distribution passages, the distribution passages in each of said pairs being disposed normal to one of said runner passages so as to communicate with the opposite ends of said last mentioned runner passage and also being positioned to form outlets in the ends of the side of the manifold closest to said last mentioned runner passage for communication with the end cylinder in the bank adjacent said last mentioned side, two branch passages disposed normal to said runner pasages and extending transversely of said manifold, each of said branch passages communicating with the center of one of said runner passages and forming an outlet in the side of said manifold farthest from said last mentioned runner passage for communicating with the cylinders in the center of the bank adjacent said last mentioned side, and a pair of inlet ducts for fuel mixing means communicating with each of said runner passages, each of said ducts being disposed normal to a runner passage and communicating with said runner passage between a distribution passage and a branch passage, and exhaust conduits extending transversely through said manifold in heat exchanging relation to said inlet ducts.

12. An intake manifold for an engine having two angularly disposed banks of cylinders with four aligned cylinders in each of said banks, said manifold comprising a pair of substantially parallel runner passages, each of said runner passages extending longitudinally of said manifold substantially parallel to a side thereof which is adjacent to and parallel with one of said banks of cylinders, two pairs of distribution passages, the distribution passages in each of said pairs being disposed normal to one of said runner passages so as to communicate with the opposite ends of said last mentioned runner passage and also being positioned to form outlets in the ends of the side of the manifold closest to said last mentioned runner passage for communication with the end cylinder in the bank adjacent said last mentioned side, two branch passages disposed normal to said runner passages and extending transversely of said manifold, each of said branch passages communicating with the center of one of said runner passages and forming an outlet in the side of said manifold farthest from said last mentioned runner passage for communicating with the cylinders in the center of the bank adjacent said last mentioned side, and a pair of inlet ducts communicating with each of said runner passages, the ducts in each of said pairs being disposed normal to a runner passage and communicating with said last mentioned runner passage between a distribution passage and a branch passage, two primary carburetors each of which communicate with one of the inlet ducts in each of said pair, two secondary carburetors, each of which communiates with the other inlet duct in each of said pair, and a throttle control linkage for actuating the throttle valves in said carburetors, said linkage having lost motion means for permitting the throttles in said primary carburetors to partially open before the throttle valves in said secondary carburetors open, and exhaust conduits extending transversely through said manifold in heat exchanging relation to said inlet ducts.

13. An intake manifold for an engine having two angularly disposed banks of cylinders with four aligned cylinders in each of said banks, said manifold comprising a pair of substantially parallel runner passages extending longitudinally of the manifold, each of said runner passages being substantially horizontal and parallel to a side of the manifold adjacent to and parallel with one of said banks of cylinders, two pairs of inclined distribution passages, the distribution passages in each of said pairs being disposed substantially normal to one of said runner passages and so as to communicate with the opposite ends of said last mentioned runner passage and also being positioned to form outlets in the side of the manifold closest to said last mentioned runner passage for communication with the end cylinder in the bank adjacent said last mentioned side, two inclined branch passages disposed normal to said runner passages and extending transversely of said manifold, each of said branch passages communicating with the center of one of said runner passages and forming an outlet in the side of said manifold farthest from said last mentioned runner passage for communicating with the cylinders in the center of the bank adjacent said last mentioned side, two pairs of substantially horizontal inlet ducts disposed substantially normal to said runner passages, each of the inlet ducts in each of said pairs communicating with only one of said runner passages at spaced points located between said distribution passages and said branch passages, and exhaust passages, extending transversely through said manifold in heat exchangeing relation with said inlet ducts, a plurality of enlarged portions in said conduits forming chambers in heat exchanging relation with the surface of said runner passage at the intersection thereof with said ducts.

14. A throttle control linkage for a pair of primary carburetors and a pair of secondary carburetors comprising a rotatable shaft, levers projecting from said shaft for rotation therewith, links interconnecting said levers with the throttle valves in said primary carburetors, a second set of levers mounted on said shaft for rotating relative to said shaft about the axis of said shaft for rotating movement, a second set of links connecting said second set of levers with the throttle valves in said secondary carburetors, and lost motion means mounted on said shaft for rotation therewith and being positioned to engage said second set for levers and cause said second levers to rotate with said shaft after said primary throttle valves are partially open.

15. A throttle linkage for simultaneously actuating the throttle valves in a pair of primary carburetors and the throttle valves in a pair of secondary carburetors for an engine, said linkage comprising a shaft adapted to be rotatably mounted on said engine and having a pair of levers projecting therefrom, a pair of links connecting each of said levers to one of said primary valves, a second set of levers journaled on said shaft for rotation about the axis of said shaft, a second pair of links connecting each of said second levers to one of said secondary throttle valves, and an arm secured to said shaft for rotation therewith and being positioned to engage said second set of levers and cause rotation thereof after said primary throttle valves are partially opened.

16. An intake manifold comprising a pair of parallel runner passages extending longitudinally thereof, distribution passages having one end thereof communicating with the opposite ends of one of said runner passages, the other ends of each of said distribution passages forming outlets in the side of said manifold closest to the respective runner passage, branch passages extending transversely of the manifold and having one end thereof communicating with the center portion of one of said runner passages, the other ends of each of said branch passages forming an outlet in the side of said manifold remote from its respective runner passage, inlet passage means communicating with each of said runner passages, at least one exhaust duct extending transversely through said manifold in heat exchanging relation with at least a portion of said passages.

17. An intake manifold comprising a pair of parallel runner passages extending longitudinally thereof, distribution passages having one end thereof communicating with the opposite ends of one of said runner passages, the other ends of each of said distribution passages forming outlets in the side of said manifold adjacent their respective runner passages, branch passages extending transversely of the manifold and having one end thereof communicating with the center portion of one of said runner passages, the other ends of each of said branch passages forming an outlet in the side of said manifold remote from its respective runner passage, inlet passage means communicating with each of said runner passages, at least one exhaust duct extending transversely through said manifold in heat exchanging relation with a portion of said passages, said duct forming hot spots in said runner passages in substantial alignment with said intake passages.

18. An intake manifold comprising a pair of parallel runner passages extending longitudinally thereof, distribution passages extending transversely of said manifold from the opposite ends of said runner passages to form outlet ports in the longitudinal sides of said manifold closest to their respective runner passages, branch passages extending transversely of said manifold, one end of each of said branch passages intersecting the center portion of one of said runner passages and the other end of each of said branch passages forming outlet ports in the side remote from its respective runner passage, a pair of exhaust ducts extending transversely of said manifold in heat exchanging relation with at least a portion of said passages, the ends of each of said ducts forming openings in a side of said manifold between the ports formed by a branch passage and a distribution passage.

19. An intake manifold comprising a pair of parallel runner passages extending longitudinally thereof, distribution passages extending transversely of said manifold from the opposite ends of said runner passages to form outlet ports in the longitudinal sides of said manifold closest to their respective runner passages, branch passages extending transversely of said manifold, one end of each of said branch passages intersecting the center portion of one of said runner passages and the other end of each of said branch passages forming outlet ports in the side remote from its respective runner passages, a pair of exhaust ducts extending transversely through said manifold in heat exchanging relation with said inlet passages and forming hot spots in said runner passages in substantial alignment with said intake passages, the ends of each of said ducts forming openings in a side of said manifold between the ports formed by said branch and distribution passages.

20. An intake manifold comprising a pair of parallel runner passages extending longitudinally thereof, inlet passages communicating with said runner passages and being disposed in the same plane as said runner passages, distribution passages extending transversely of said manifold oblique to said plane, the inner ends of said distribution passages communicating with the opposite ends of said runner passages and the other ends forming outlets in a side of said manifold adjacent the runner passage communicating therewith, branch passages oblique to said plane, the inner ends of said branch passages communicating with the center portions of said runner passages and the opposite ends of said branch passages forming outlet ports in the sides of said manifold remote from the runner passage communicating therewith.

21. An intake manifold comprising a pair of parallel runner passages extending longitudinally thereof, two groups of intake passages, each of said groups including a pair of passages which intersect one of said runner passages and are disposed in substantially the same plane so as to form inlets in the opposite side of said manifold, two groups of distribution passages, each of said groups including passages oblique to said plane and having the inner ends thereof communicating with the opposite ends of one of said runner passages and the opposite ends forming outlet ports in one side of said manifold, branch passages oblique to said plane, each of said branch passages having one end thereof communicating with the center portions of one of said runner passages, the outer ends of said branch passages forming outlet ports in the side of said manifold remote from the side having the outlet ports formed by the group of distribution passages communicating with the same runner passage.

References Cited in the file of this patent
UNITED STATES PATENTS

| | | |
|---|---|---|
| 1,761,958 | Anderson | June 3, 1930 |
| 2,434,192 | Braun | Jan. 6, 1948 |
| 2,640,471 | Haltenberger | June 2, 1953 |